US005787598A

United States Patent [19]

Tillis, Sr. et al.

[11] Patent Number: 5,787,598

[45] Date of Patent: Aug. 4, 1998

[54] LABELING EQUIPMENT ALIGNMENT TOOLING

[75] Inventors: James W. Tillis, Sr.; Torello Tacchi, both of Jacksonville, Fla.

[73] Assignee: Anheuser-Busch, Inc., St. Louis, Mo.

[21] Appl. No.: 561,295

[22] Filed: Nov. 21, 1995

[51] Int. Cl.$^6$ ...................................................... G01D 21/00

[52] U.S. Cl. ................................ 33/645; 33/562; 156/567

[58] Field of Search .............................. 33/501, 613, 562, 33/645; 156/567, 568, 578

[56] References Cited

U.S. PATENT DOCUMENTS

| | | | |
|---|---|---|---|
| D. 291,287 | 8/1987 | Eisenhauer | D10/64 |
| 2,202,683 | 5/1940 | Baesgen et al. . | |
| 2,406,515 | 8/1946 | Studler . | |
| 2,686,959 | 8/1954 | Robinson | 33/613 |
| 3,600,813 | 8/1971 | Davis . | |
| 4,958,814 | 9/1990 | Johnson | 33/613 X |
| 5,081,771 | 1/1992 | McGregor et al. . | |
| 5,117,560 | 6/1992 | Nevins . | |
| 5,386,641 | 2/1995 | Hladovcak . | |
| 5,392,524 | 2/1995 | Hill . | |

OTHER PUBLICATIONS

Krones, "Basics of Rotary Labeling, Sixth Edition, Jul., 1992.

*Primary Examiner*—James Engel
*Attorney, Agent, or Firm*—Sidley & Austin

[57] ABSTRACT

Labeling equipment alignment tooling for properly adjusting the components of the label transfer system of rotary labeling equipment including a pallet timing plate, a pallet centerline locator, a gripper timing protractor, and a pallet measuring tool.

10 Claims, 14 Drawing Sheets

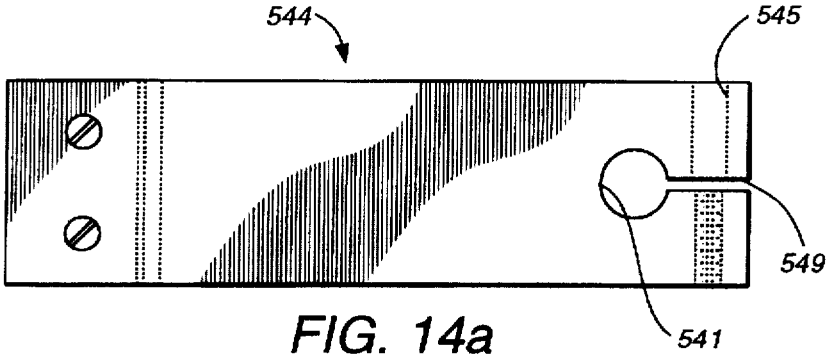
FIG. 14a
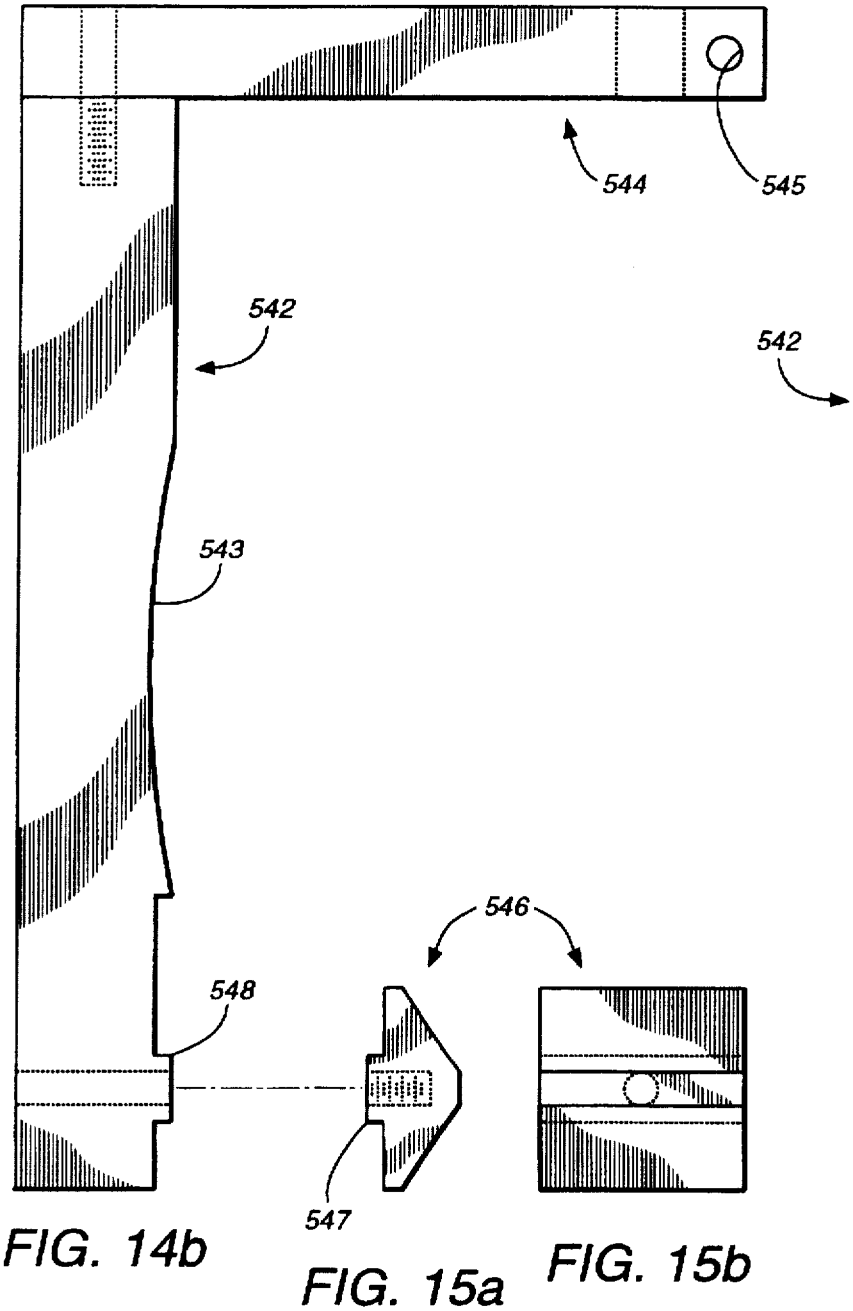
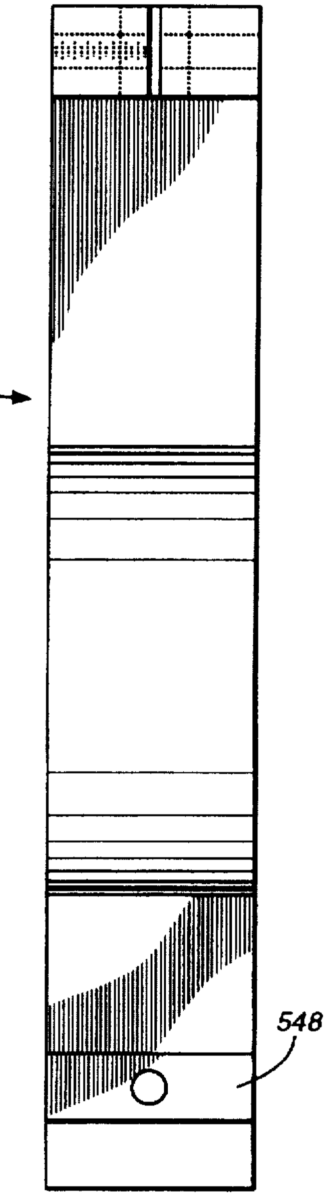
FIG. 14b
FIG. 15a
FIG. 15b
FIG. 14c

LABELING EQUIPMENT ALIGNMENT TOOLING

BACKGROUND OF THE INVENTION

Technical Field of the Invention

The present invention relates in general to the label transfer system of rotary labeling equipment, and in particular, to alignment tooling that is useful to properly align the label transfer system and to methods using the alignment tooling.

Description of the Prior Art

Rotary labeling equipment is widely used in the labeling industry. Increasing processing speeds for rotary labeling equipment leads to tighter tolerances for machine settings. Misalignment of the equipment leads to increased down-time to improperly labeled containers that must be reworked. Thus, there is a need in the art for new inventions that improve the functioning of rotary labeling equipment and that decrease equipment down-time.

Krones is a leading manufacturer of rotary labeling equipment. Krones labeling equipment is described in "Basics of Rotary Labeling", Sixth Edition, by Krones. Among other models, Krones manufactures Solomatic and Topmatic rotary labeling equipment. Krones manufactures a pallet timing fixture and a shop fixture for adjusting the gripper cylinder. The use of these fixtures to align the labeling equipment involves a significant amount of down-time and does not readily and repeatably provide for the proper alignment of all the necessary components of the label transfer system.

SUMMARY OF THE INVENTION

In accordance with the present invention, the disclosed labeling equipment alignment tooling and methods of use thereof reduce or eliminate the disadvantages and shortcomings associated with the prior art by allowing for the proper adjustment and alignment of the label transfer system of rotary labeling equipment. The alignment tooling of the present invention includes a pallet timing plate, a pallet centerline locator, a gripper timing protractor, and a pallet measuring tool.

The pallet timing plate of the present invention is used to align a pallet table shaft, a pallet and a glue roller of the label transfer system and includes a plane having a first end portion, a second end portion, and a middle portion that is disposed between the first end portion and the second end portion. The first end portion has a glue roller support locator. The middle portion has a pallet shaft positioner locator. The second end portion has a pallet table shaft locator. The locators of the present invention serve to locate the elements of the label transfer system in the proper position.

The process of the present invention used for aligning a pallet table shaft, a pallet and a glue roller of the label transfer system utilizes the pallet timing plate of the present invention and includes placing a pallet shaft positioner in the pallet shaft sleeve, and positioning the pallet timing plate such that the glue roller support locator locates the glue roller support, the pallet shaft positioner locator locates the pallet shaft positioner, and the pallet table shaft locator locates the pallet table shaft.

The centerline locator of the present invention is used for aligning a pallet table shaft, a pallet and a gripper table shaft of the label transfer system and includes a plane having a first end portion, a second end portion, and a middle portion disposed between the first end portion and the second end portion. The first end has a gripper table shaft locator. The middle portion has a pallet edge positioning element. The second end portion has a pallet table shaft positioning element.

The process of the present invention used for aligning a pallet table shaft, a pallet and a gripper table shaft of the label transfer system utilizes the centerline locator of the present invention and includes positioning the centerline locator such that the gripper table shaft locator locates the gripper table shaft; adjusting the pallet such that the edge is capable of contacting the pallet edge positioning element; contacting the edge of the pallet with the pallet edge positioning element; and contacting the pallet table shaft with the pallet table shaft positioning element.

The gripper timing protractor of the present invention is used for properly aligning a gripper cylinder with respect to a pallet table of a label transfer system and includes a horizontal base having a substantially circular plane that has a centrally disposed portion comprising a gripper cylinder shaft receiving aperture or locator; a protractor element pivotally coupled to the base; and a securing element coupled to the base to secure the base such that the protractor element may pivot with respect to the base.

The gripper timing protractor of the present invention may alternatively include a horizontal base having a substantially circular plane that has a centrally disposed portion having a gripper table shaft receiving aperture or locator; a radial positioning element pivotally coupled to the base; and a securing element to secure the base in a stationary position.

The process of the present invention used for using the gripper timing protractor of the present invention includes placing the protractor on the gripper table shaft; placing the gripper cylinder on the gripper table shaft; securing the base of the protractor using the securing element; adjusting the protractor element to determine the angular position of the anvil with respect to the edge of the pallet; and using the radial positioning element to position the anvil.

The measuring tool of the present invention is used for measuring a pallet of a label transfer system and includes a horizontal base having a first end and a second end; a first vertical cradle support and a second vertical cradle support. The first vertical cradle support is attached to the first end of the horizontal base. The second vertical cradle support is attached to the second end of the horizontal base. Also included is a cradle having a first pallet shaft securing element, a second pallet shaft securing element, and a base. The base of the cradle has a first end and a second end. The first pallet shaft securing element is coupled to the first end of the cradle base that is rotatably coupled to the first vertical cradle support. The second pallet shaft securing element is coupled to the second end of the cradle base that is rotatably coupled to the second vertical cradle support. Also included is an indicator support that is adjustably coupled to the horizontal base so as to allow a supported indicator to inspect a pallet of a pallet shaft inserted into the cradle.

The process of the present invention used for using the measuring tool of the present invention to inspect the pallet of a label transfer system includes placing a pallet shaft having at least one pallet in the cradle and rotating the cradle such that the pallet contacts an indicator disposed in the indicator support.

BRIEF DESCRIPTION OF DRAWINGS

FIG. 14*a* is a top view of an indicator support for the pallet measuring tool base of FIG. 13;

FIG. 14*b* is a side view thereof;

FIG. 14*c* is a front view thereof;

FIG. 15*a* is a side view of a securing element of the pallet measuring tool base of FIG. 13;

FIG. 15*b* is a top view thereof;

DETAILED DESCRIPTION

The present invention pertains to the label transfer system of rotary labeling equipment. The label transfer system is responsible for applying labels to containers such as bottles. Many machine-related labeling problems originate within this area and considerable care and attention must be given to equipment alignment, timing, and operation. The present invention provides means to properly set, time, and operate the components of the label transfer system to correct or significantly reduce machine-related labeling problems.

Figure 1:
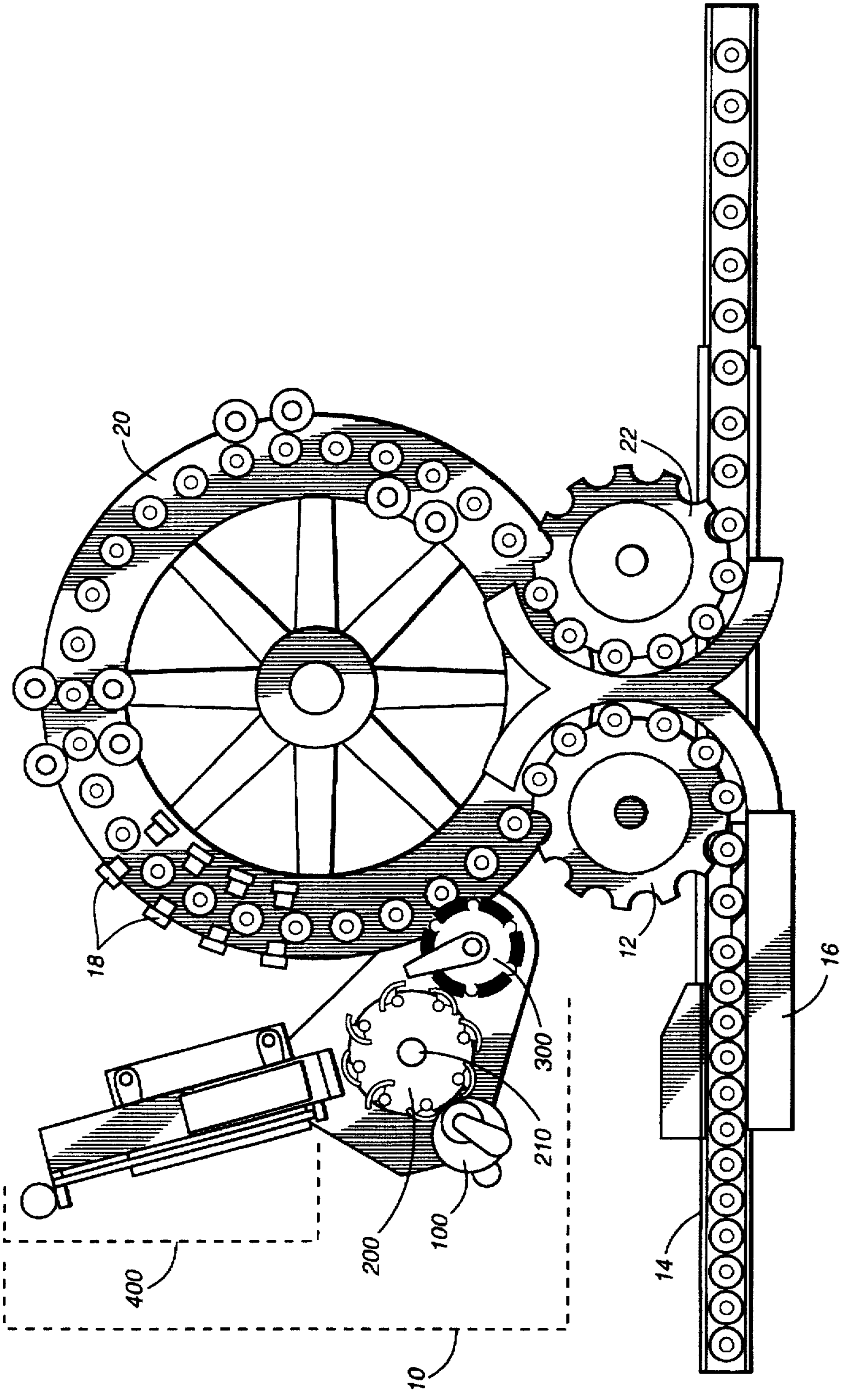
FIG. 1 is a top view of rotary labeling equipment suitable for use with the current invention.

As shown in FIG. 1, containers enter the rotary labeling equipment by conveyor 14 in single file and are separated by feedscrew 16 to provide proper spacing for infeed star 12. Infeed star 12 transfers containers onto table 20 where they are positioned on bottle plates and held firmly down by overhead centering belts. Once a container is positioned, it accepts label(s) from label transfer system 10. Adhesive supply, label supply, and all label transfer components are centralized on label transfer system 10.

After the container has received a label from label transfer system 10, the container will move away from the application point on bottle table 20 and through stationary brush stations 18 which smooth and secure the label to the container. Labeled containers move to the discharge end of the machine where centering belts lift off just as discharge star 22 takes control of the container. The container is then transferred onto conveyor 14 for discharge.

Label transfer system 10 includes glue roller 100, pallet table 200, gripper table 300, and label magazine 400.

Figure 2:
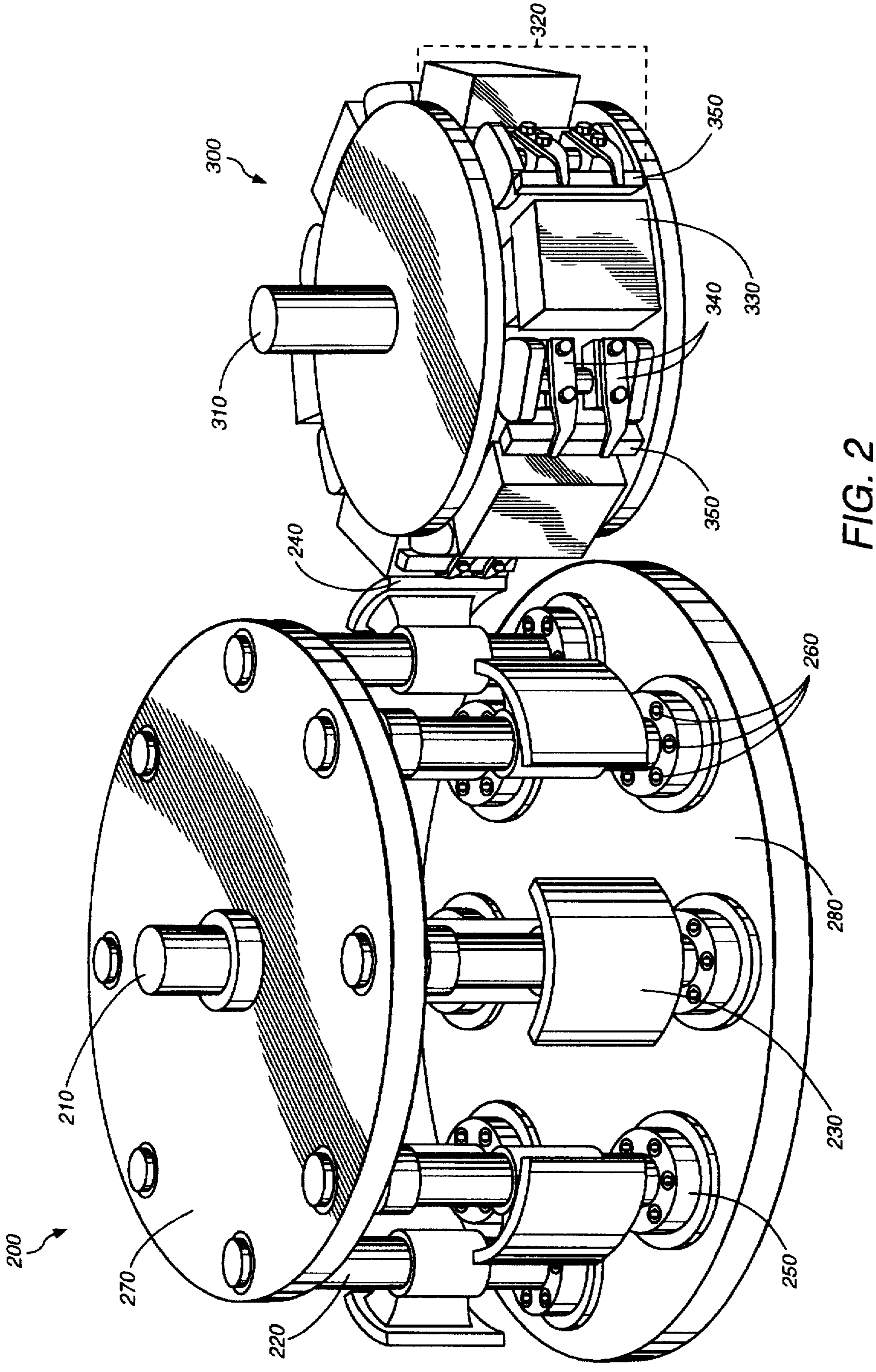
FIG. 2 is an enlarged perspective view of the rotary labeling equipment of FIG. 1.

Pallet table 200 rotates on pallet table shaft 210 which is located in the center of the pallet table. As can be seen in FIG. 2, pallet table 200 has several pallet shafts 220, each with its own pallet 230. The pallet shafts 220 are parallel to pallet table shaft 210. Each pallet shaft 220 may have more than one pallet 230. Pallet 230 has pallet leading edge 240. The lower end of pallet shaft 220 is positioned in pallet shaft sleeve 250 on pallet table base 280 and is secured by screws 260. The upper end of pallet shaft 220 is attached to pallet table cover 270.

The rotation of pallet table 200 allows pallet 230 to rotate past glue roller 100 which transfers a glue film to each pallet 230. Glue roller 100 is located on glue roller support 110. After pallet 230 obtains a glue film from glue roller 100, it then rotates past label magazine 400 to pick up a label. This process transfers glue from pallet 230 to the backside of the label.

Gripper table 300 contains at least one gripper cylinder 320 which rotates on gripper table shaft 310. The labels with glue film are transferred from pallet 230 to gripper cylinder 320. Gripper cylinder 320 has several gripper sponges 330 located on its periphery. Gripper cylinder 320 also has several sets of gripper fingers 340 that close onto anvils 350. The transfer of labels occurs when gripper fingers 340 close onto anvil 350 as a result of the closing cam. Timing of the closing of gripper fingers 340 onto anvil 350 must be precise to allow gripper fingers 340 to close on the label near pallet edge 240. The distance between anvil 350 and pallet 230 is referred to as the anvil distance. The anvil distance must properly align anvil 350 with pallet edge 240 to allow for proper transfer of the label.

When the label is transferred to a gripper cylinder 320, the edge of the label is positioned between gripper fingers 340 and anvil 350. The remainder of the label is disposed over a gripper sponge 330. Gripper sponges 330 provide the initial label application to the container. The opening cam timing is set to allow gripper fingers 340 to release the label upon gripper sponge contact with the container. The air blast timing is set to allow a burst of air to be released that is directed toward the label so as to assist label transfer to the container. The point at which the label is transferred from label transfer system 10 to the container is referred to as the application point.

The following inventions include a pallet timing plate, a pallet centerline locator, a gripper timing protractor, and a pallet measuring tool. The pallet timing plate allows for proper adjustment and alignment of the pallet table shaft 210, pallet 230, and glue roller 100. The pallet centerline locator allows for proper adjustment and alignment of pallet table shaft 210, pallet 230, and gripper table shaft 310. The gripper timing protractor allows for proper adjustment and alignment of gripper cylinder 320 with respect to pallet table 200. Pallet measuring tool 500 allows for pallet inspection. These inventions serve to properly adjust, align, and inspect portions of label transfer system 10 which are essential for the proper functioning of rotary labeling equipment. After using the instant inventions, subsequent alignments and adjustments may be performed accurately and in a short period of time. Thus, the instant invention prevents down-time and saves man-hours while ensuring accuracy.

The present inventions provide accurate and timely alignment and adjustment in every label transfer system of rotary labeling equipment. However, the preferred embodiments described herein may require adaptations to individual machines because proper alignment and adjustment is in general machine specific.

PALLET TIMING PLATE

The pallet timing plate of the present invention allows for proper adjustment and alignment of pallet table shaft 210, pallet 230, and glue roller 100. Properly positioning pallet 230 with respect to glue roller 100 promotes consistent label transfer with a minimum amount of wear to glue roller 100, pallet 230, and associated bearings. The motion of pallet 230 as it moves past glue roller 100 is eccentric, not rotational, and is critical for correct adhesive pick-up.

Figure 3:
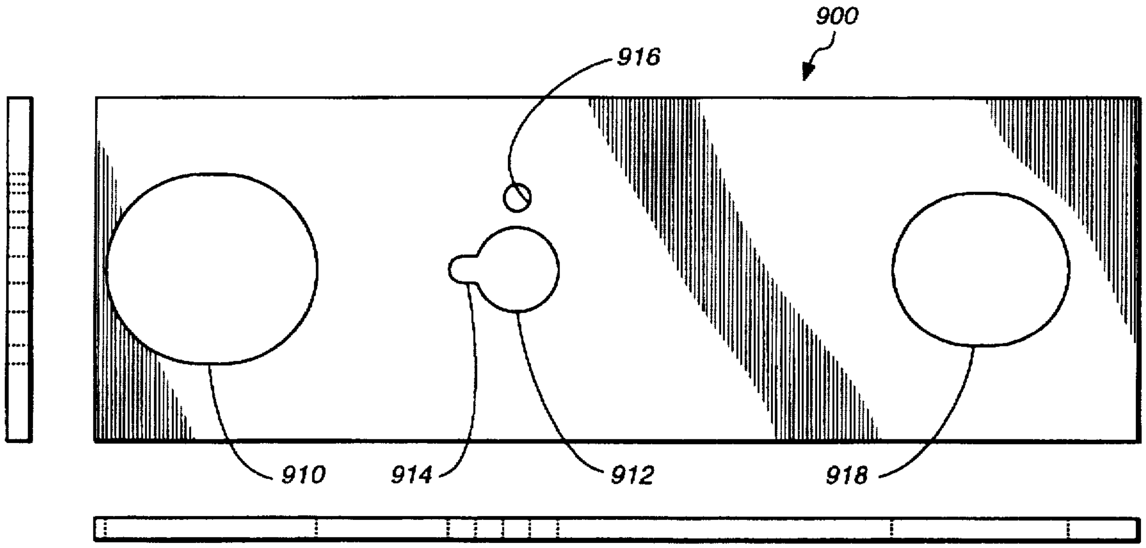
FIG. 3 is a top view with side and end projections of a pallet timing plate according to one aspect of the present invention.

As shown in FIG. 3, the pallet timing plate of the present invention includes plane 900 having a first end portion, a middle portion, and a second end portion, wherein the middle portion is disposed between the first end portion and the second end portion. The term "plane" as used herein is not limited to a completely smooth surface made of one piece of material. In general, whether the plane itself is smooth or made of one piece of material is not critical to the utilization of the instant invention.

The first end portion includes glue roller support locator 910. Glue roller support 110 may be any support or positioner used to fix the location of glue roller 100 and is preferably the support used in normal operation. The term "locator" as used herein need not comprise an entire cylindrical aperture; any configuration sufficient to fix the location of an object to be located may be used as a locator. Moreover, the interior shape of the locator is preferably substantially determined by the shape of the object being located such that the locator shape provides a secure fit with the object located.

The middle portion includes pallet shaft positioner locator 912. It is preferred that a pallet shaft positioner is used instead of an actual pallet shaft 220. The pallet shaft positioner may be any object placed in pallet shaft sleeve 250 that affords a reference for the actual position of pallet shaft 220. The pallet shaft positioner is preferably keyed so as to conform to the same shape as the part of pallet shaft 220 that is positioned in pallet shaft sleeve 250. The pallet shaft positioner is preferably positioned within pallet shaft sleeve 250 by screws 260 while using the pallet timing plate. Pallet shaft positioner locator 912 preferably includes keyed positioner locator 914. The second end portion includes pallet table shaft locator 918. The middle portion optionally and preferably includes pallet shaft securing tool receiving aperture 916. Pallet shaft securing tool aperture 916 allows an operator to place a pallet shaft securing tool through the aperture to adjust screws 260. The preferred pallet shaft securing tool is an Allen wrench.

The pallet timing plate of the present invention is used by positioning it on pallet table shaft 210, pallet shaft 220, and glue roller support 110. A preferred method of using the pallet timing plate involves removing pallet table cover 270, glue roller 100, and pallet shaft 220. A pallet shaft positioner is then placed in sleeve 250 wherefrom pallet shaft 220 was removed. The pallet timing plate is then placed on pallet table shaft 210, the pallet shaft positioner, and glue roller support 110. Once the pallet timing plate is so fitted, the pallet has been properly centered to the glue roller. If the pallet timing plate will not fit on pallet table shaft 210, the pallet shaft positioner, and glue roller support 110, then screws 260 located on the pallet shaft sleeve 250 are loosened to turn the pallet shaft positioner and pallet table 200 until the pallet timing plate fits over pallet table shaft 210, the pallet shaft positioner, and glue roller support 110. Subsequently, the pallet shaft sleeve screws 260 are tightened by using a pallet shaft securing tool. This pallet shaft securing tool may be placed through the optional pallet shaft securing tool receiving aperture of the pallet timing plate or by first removing the pallet timing plate and then tightening pallet shaft sleeve screws 260. This procedure may be completed for each pallet shaft 220 contained on pallet table 200.

An embodiment of the present invention shown in FIG. 3 includes a pallet timing plate useful for Krones Solomatic Labeler. This embodiment involves both glue roller support locator 910 and pallet table shaft locator 918 having an oval-like shape. The distance between the center of glue roller support locator 910 and the center of pallet shaft positioner locator 912 is about 3.5 inches. The distance between the center of pallet shaft positioner locator 912 and the center of pallet table shaft locator 918 is about 5.3 inches.

An embodiment of the present invention shown in FIG. 3 includes a pallet timing plate useful for Krones Topmatic Labeler. This embodiment involves both glue roller support locator 910 and pallet table shaft locator 918 having an oval-like shape. The distance between the center of glue roller support locator 910 and the center of pallet shaft positioner locator 912 is about 3.4 inches. The distance between the center of pallet shaft positioner locator 912 and the center of pallet table shaft locator 918 is about 5.5 inches.

The oval-like shape of apertures 910 and 918 assists in the utilization of the instant invention by decreasing the time required to use the devices without affecting accuracy.

PALLET CENTERLINE LOCATOR

The pallet centerline locator of the present invention is useful in the label transfer system of rotary labeling equipment to locate the centerline between gripper table shaft 310, pallet table shaft 210, and pallet edge 240.

The pallet centerline locator of the present invention includes a plane having a first end portion, a middle portion, and a second end portion. The middle portion of the plane is disposed between the first end portion and the second end portion. The first end portion has a gripper table shaft locator. This locator is preferably an aperture that receives the gripper table shaft and allows the centerline locator to rotate around the gripper table shaft. The pallet centerline locator includes an element for positioning a pallet edge. This positioning element is alternatively connected to or a part of the middle portion of the centerline locator. The pallet edge positioning element is also referred to as a pallet edge locator block. The pallet centerline locator also contains an element for positioning the pallet table shaft. This positioning element is alternatively connected to or a part of the second end portion. The pallet table shaft positioning element is also referred to as a pallet table shaft locator block.

Preferably, before using the pallet centerline locator, pallet shaft 220 has been properly timed using the pallet timing plate.

The centerline locator is used by positioning it on gripper table shaft 310, against pallet table shaft 210, and against pallet edge 240. A preferred method of using the pallet centerline locator involves removing gripper cylinder 320 from gripper table 300 and removing pallet table cover 270 from pallet table 200. Once pallet table cover 270 has been removed, the pallet shaft nearest the pallet edge being aligned should be removed and pallet table cover 270 should be replaced. The pallet centerline locator may then be placed over gripper table shaft 310, butted up against pallet edge 240, and butted up against pallet table shaft 210. In order to have pallet edge 240 butt up against the pallet centerline locator, it may be necessary to rotate pallet table 200 and adjust screws 260. Note that pallet table 200 should always be rotated in its normal sense of rotation.

Once the pallet centerline locator has been used, it may be preferred to mark the pallet table and a portion of the label transfer system close to the pallet table so as to provide a useful reference point.

Figure 4:
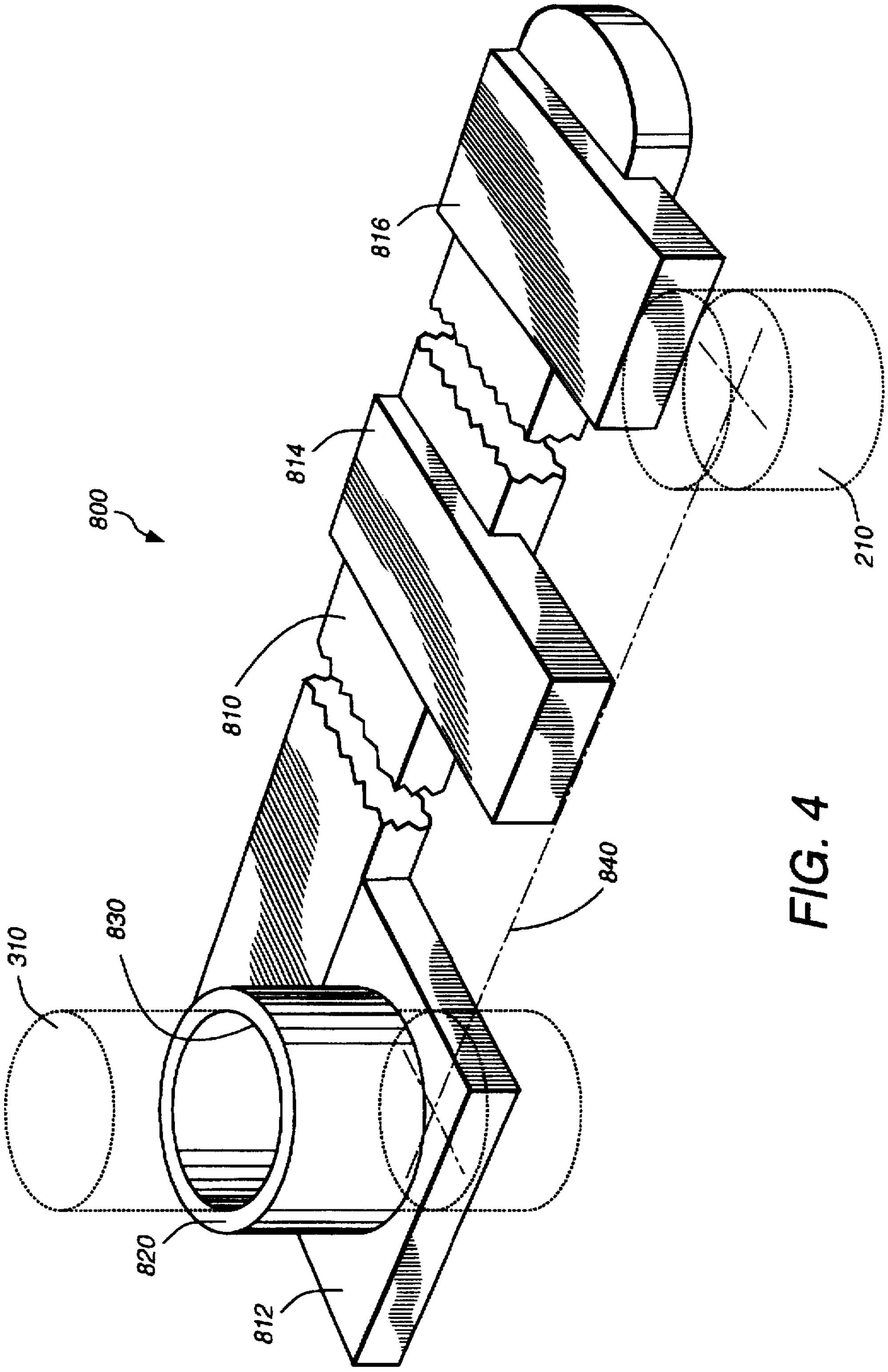
FIG. 4 is a perspective view, with portions broken away, of a pallet centerline locator according to another aspect of the current invention.

As shown in FIG. 4, the pallet centerline locator of the present invention that is preferred for Krones Topmatic Labelers includes plane 810 having a gripper table shaft receiving aperture 830. Gripper table shaft receiving aperture 830 is preferably defined by gripper table shaft receiving aperture housing 820 connected to first end portion 812. Pallet edge positioning element 814 is also connected to plane 810. Pallet table shaft positioning element 816 is also connected to plane 810. Centerline 840 extends from the center of gripper table shaft receiving aperture 830, along pallet edge positioning element 814, and along pallet table shaft positioning element 816.

Figure 5:
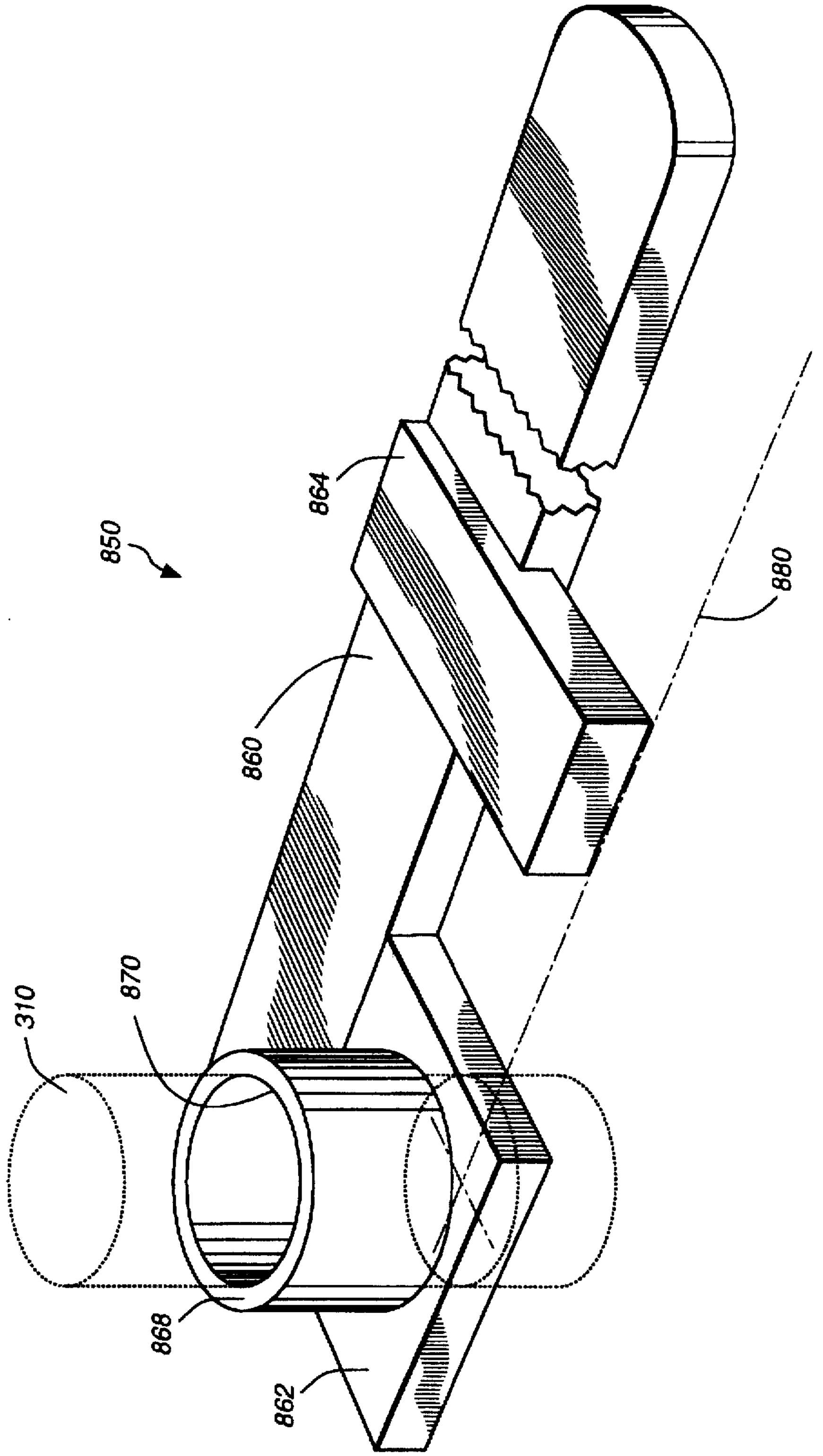
FIG. 5 is a perspective view, with portions broken away, of a pallet centerline locator according to another embodiment of the current invention.
Figure 6A:
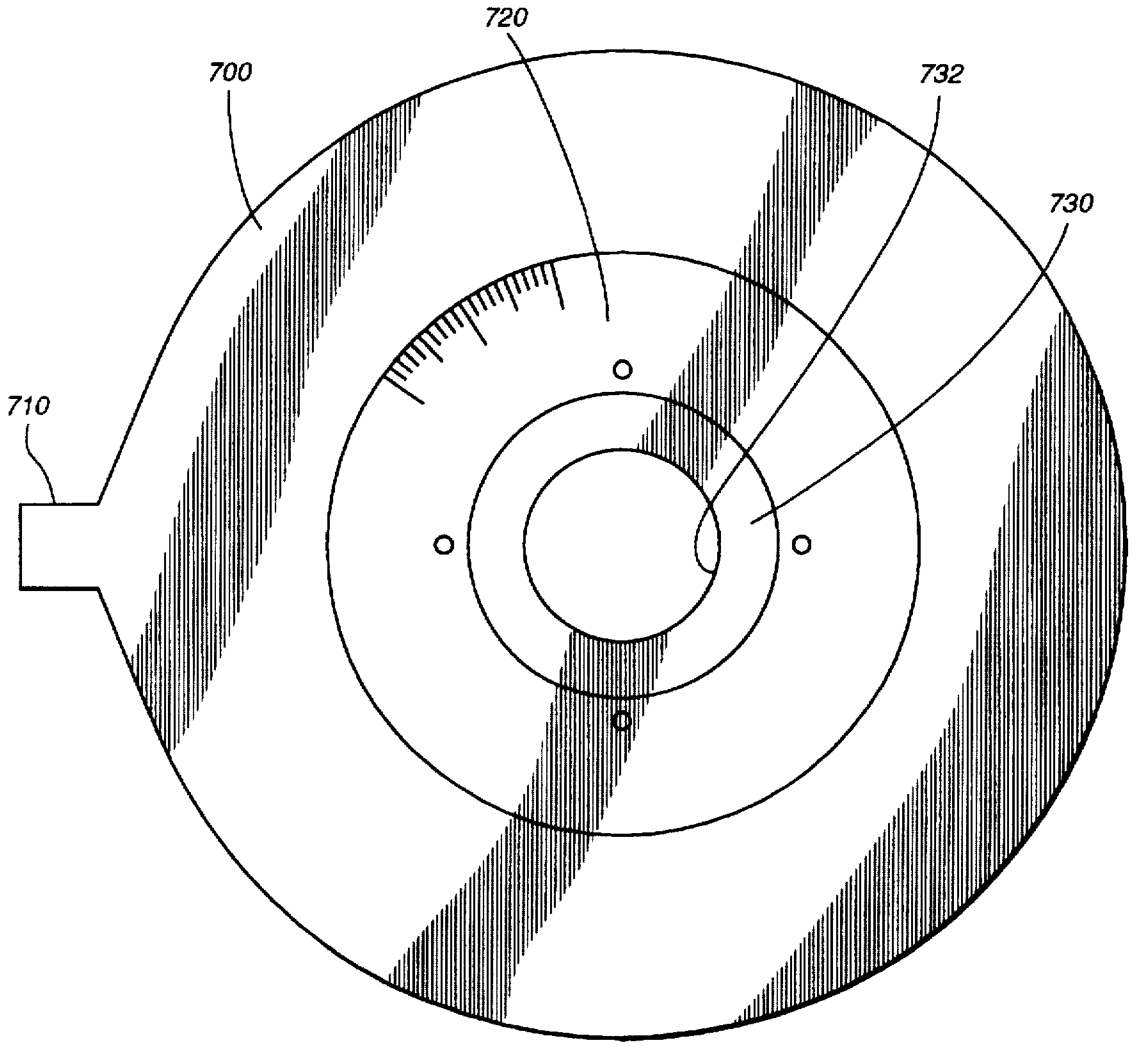
FIG. 6*a* is a top view of a horizontal base for the gripper timing protractor of FIG. 12.
Figure 6B:
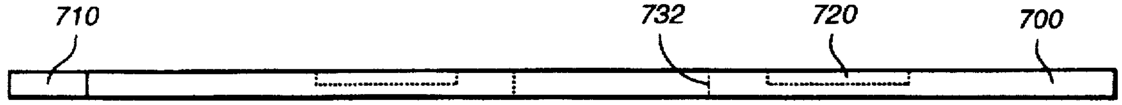
FIG. 6*b* is a side view thereof.
Figure 7A:
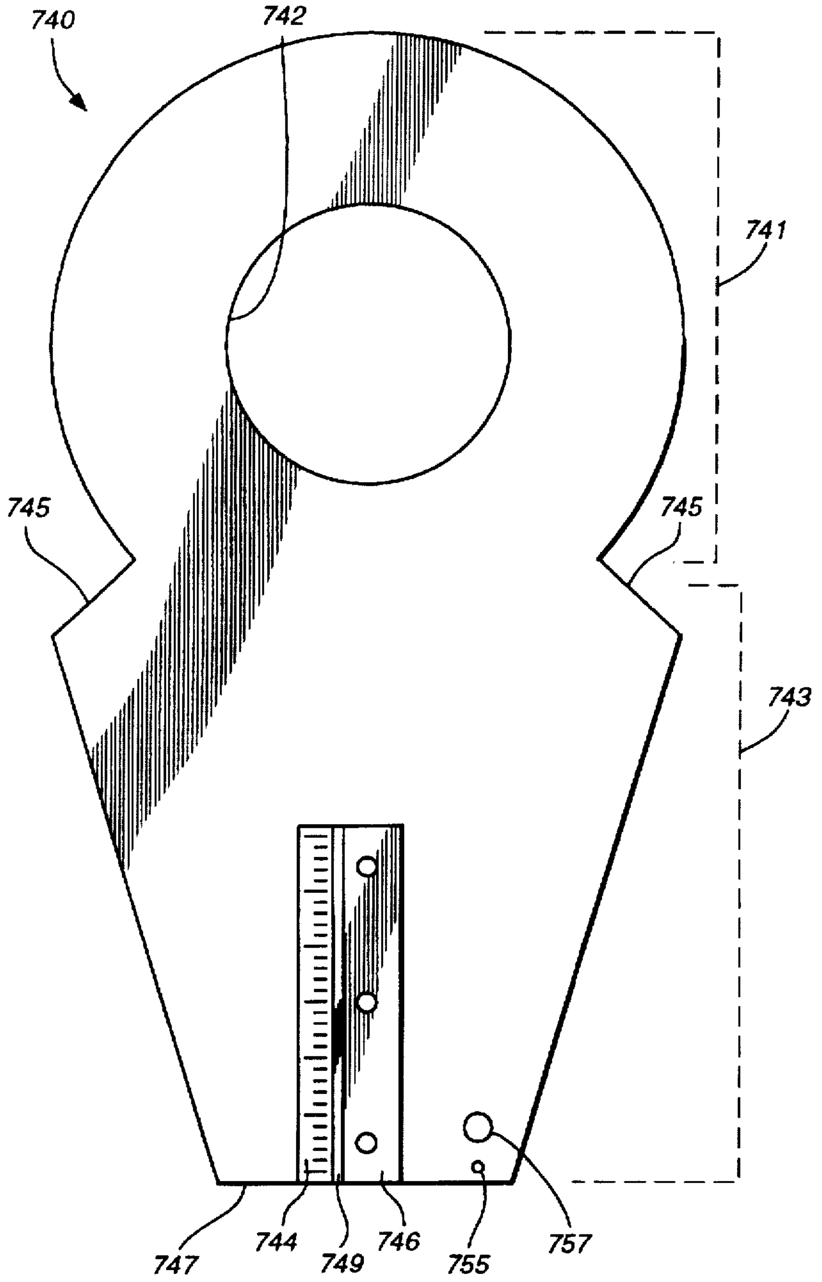
FIG. 7*a* is a top view of a protractor arm for the gripper timing protractor of FIG. 12.
Figure 7B:
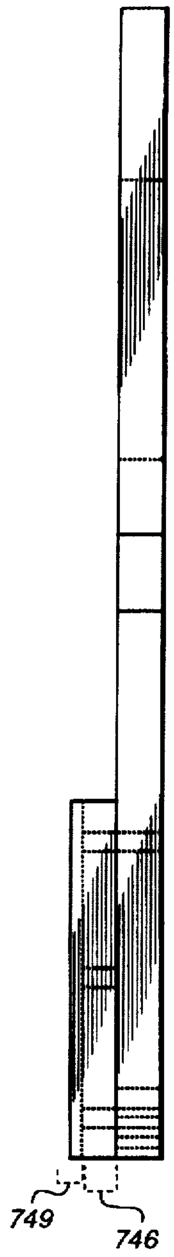
FIG. 7*b* is a side view thereof.
Figure 8A:
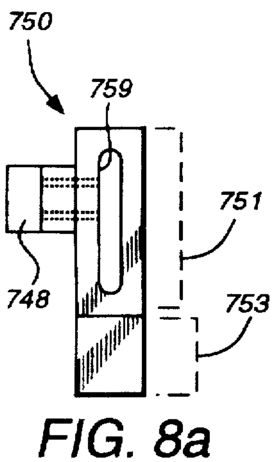
FIG. 8*a* is a top view of a timing bar for the gripper timing protractor of FIG. 12.
Figure 8B:
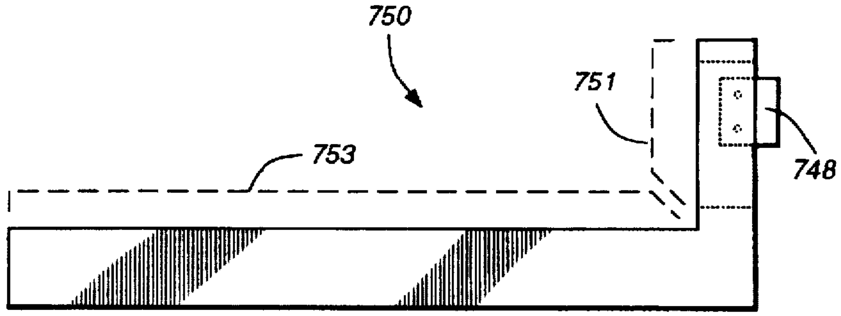
FIG. 8*b* is a side view thereof.
Figure 9A:
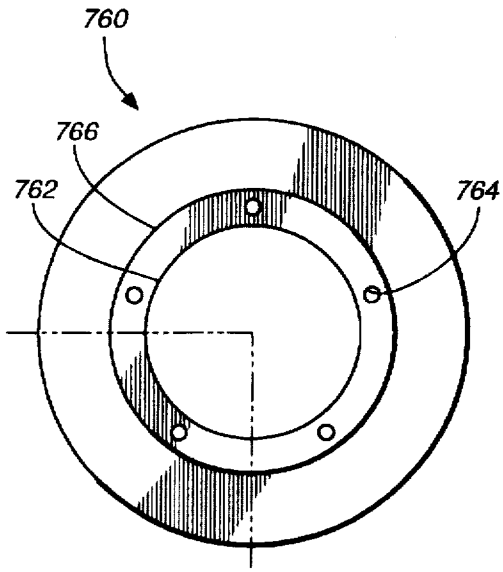
FIG. 9*a* is a top view of a hub for the gripper timing protractor of FIG. 12.
Figure 9B:
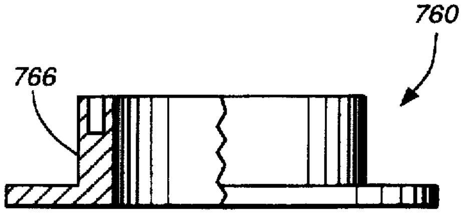
FIG. 9*b* is a side view thereof.

As shown in FIG. 5, the pallet centerline locator of the present invention that is preferred for Krones Solomatic Labelers includes plane 860 that includes gripper table receiving aperture 870 that is defined by gripper cylinder receiving aperture housing 868 that is connected to first end portion 862. Pallet edge positioning element 864 extends from plane 860. Centerline 880 extends from the center of gripper cylinder shaft receiving aperture 870 along pallet edge positioning element 864.

GRIPPER TIMING PROTRACTOR

The gripper timing protractor allows for proper adjustment and alignment of gripper cylinder 320 with respect to pallet table 200. The gripper timing protractor is useful to obtain the proper setting of the anvil distance, closing cam timing, opening cam timing, gripper position, and air blast timing to allow for the proper transfer of labels with glue film from pallet table 200 to the gripper cylinder 320 and from gripper cylinder 320 to the container. Precise gripper settings are important to ensure smooth label transfer and application. Once the proper anvil distance and gripper position have been established, the closing cam timing is automatically properly adjusted. Moreover, once the opening cam timing, also referred to as the release timing, is established, the air blast timing is automatically properly adjusted.

Once the gripper timing protractor has been used to determine precise gripper settings, it may then be subsequently used to reset any improperly positioned element to the settings determined to be proper during its first use. Before using the gripper timing protractor, it is preferred to have utilized the pallet centerline locator and the pallet timing plate. The use of the gripper timing protractor requires the operator to predetermine the proper label and pallet height. Note that timing locations must be established for each individual machine.

Figure 12:
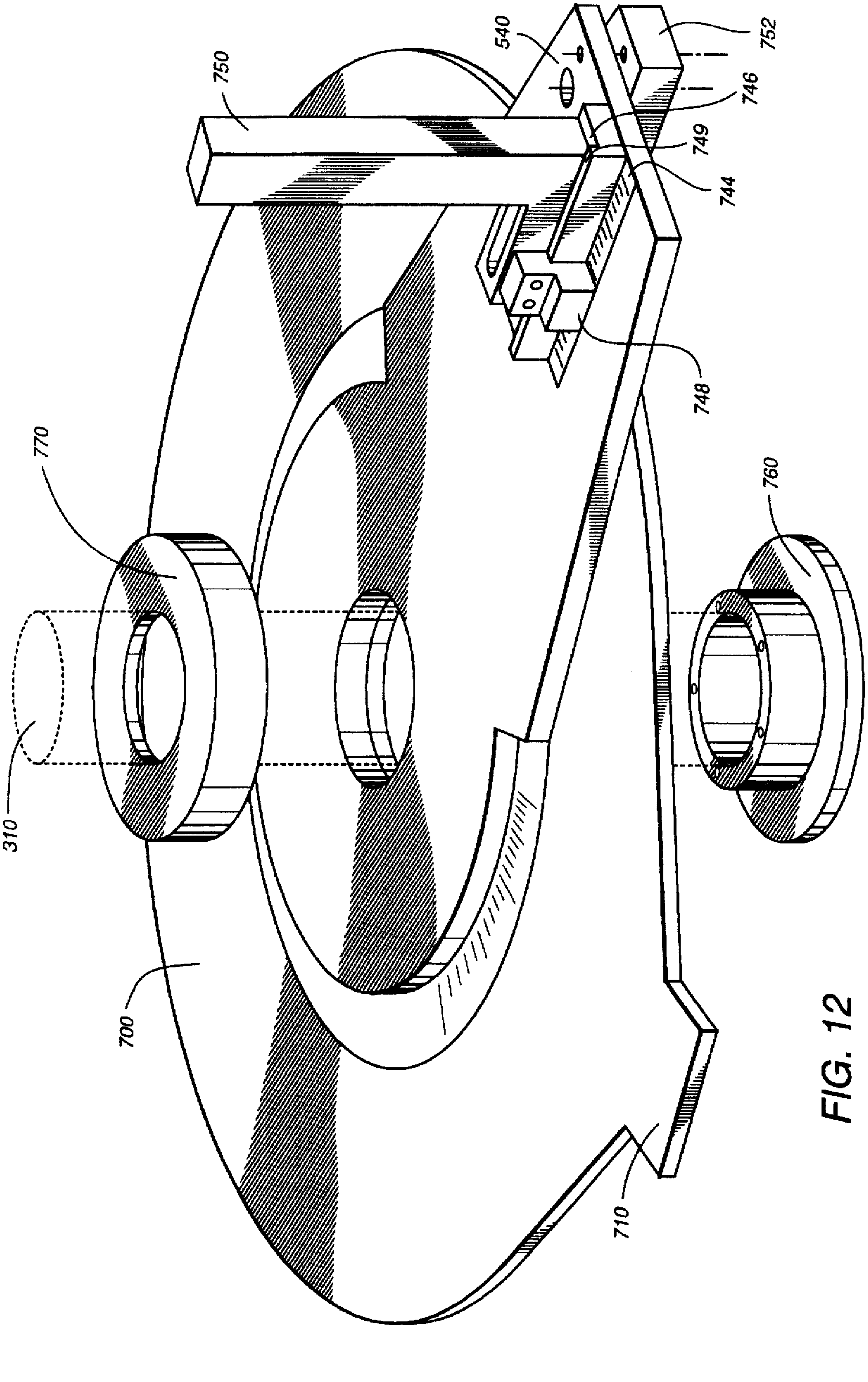
FIG. 12 is a perspective view of a gripper timing protractor according to another aspect of the current invention incorporating the components illustrated in FIGS. 6*a*–11*b*.
Figure 13:
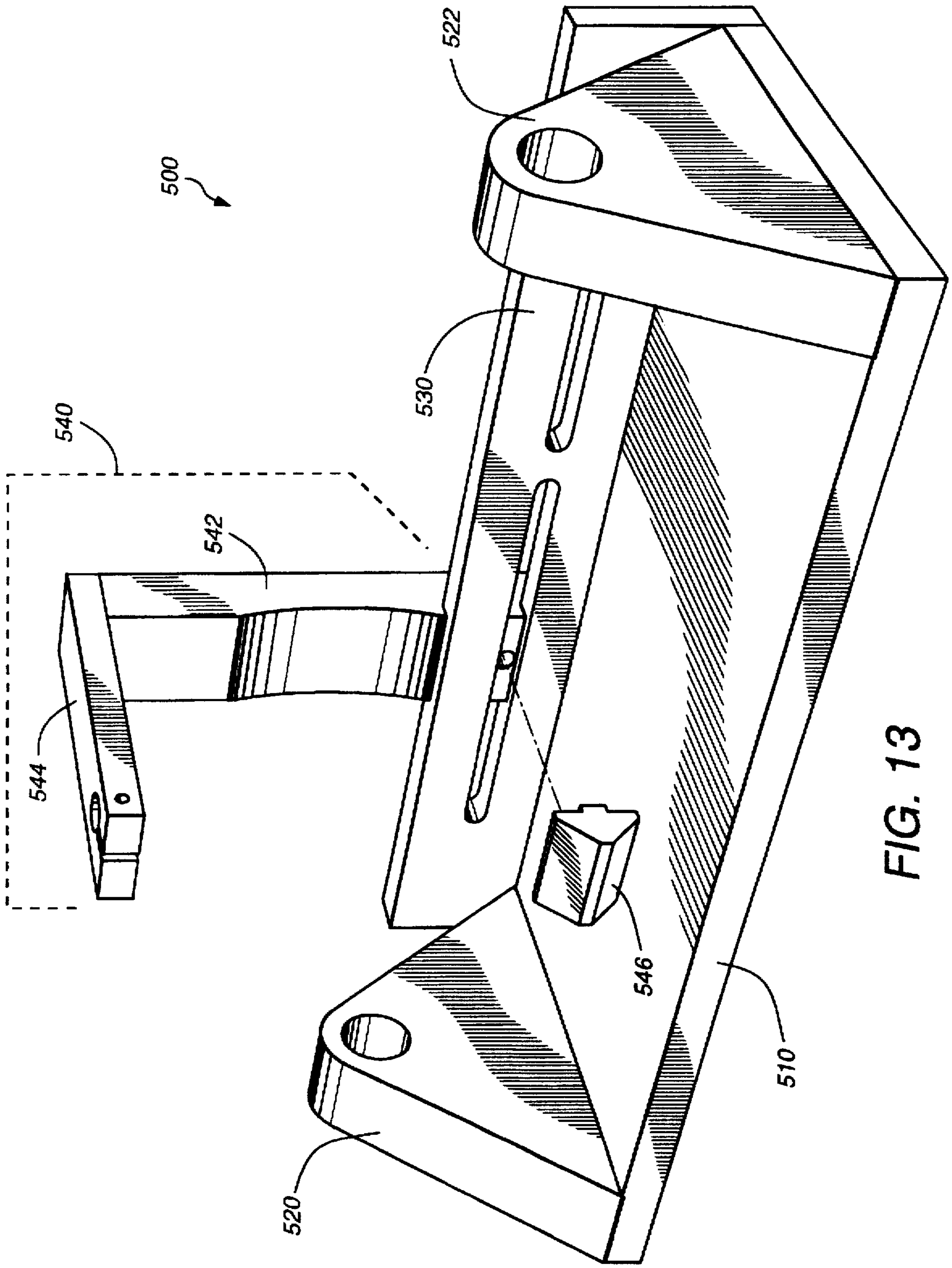
FIG. 13 is a perspective view of a base for a pallet measuring tool according to another aspect of the current invention.

As shown in FIG. *6a*, the gripper timing protractor of the present invention includes horizontal base 700 having gripper table shaft receiving aperture 732. Horizontal base 700 is preferably a substantially circular plane having a centrally disposed portion. Gripper table shaft receiving aperture 732 is surrounded by degree wheel 720. Degree wheel 720 is disposed within a channel in base 700 such that the top surface of the degree wheel forms a smooth plane surface with the top of base 700. Base 700 has attached thereto securing element 710. As shown in FIG. 12, base 700 is disposed between hub 760 and cover 770 and protractor 740 is disposed between cover 770 and base 700.

As shown in FIGS. *7a* and *7b*, protractor 740 has portion 741 and portion 743. Portion 741 has aperture 742 that receives reduced diameter portion 766 of hub 760. Hub 760 receives the gripper cylinder shaft through its inner diameter 762. Thus, protractor 740 rotates about the same axis about which gripper cylinder 320 rotates.

Portion 741 is substantially circular. Portion 743 is attached to portion 741 along the outside circumference of portion 741. Preferably portions 743 and 741 are connected along about a 94° arc measured from the center of aperture 742. Portion 743 has sides 745 that are attached to portion 741 in a manner perpendicular to a line tangent to the circular outer edge of portion 741. Sides 745 provide a means to determine the location of protractor 740 by reference to degree wheel 720. Protractor 740 rotates relative to base 700. Portion 743 has outside edge 747. Ruler 744 is attached to portion 743. Timing bar support 746 is disposed on portion 743 along edge 747 and parallel to ruler 744. Timing bar support 746 has a raised portion 749. Portion 749 is disposed between adjacent ruler 744 and the remainder of timing bar support 746. Portion 743 of protractor 740 also includes roll pin receiving aperture 755 and positioning screw receiving aperture 757.

As shown in FIGS. *8a* and *8b*, timing bar 750 has a horizontal portion 751 and a vertical portion 753. Horizontal portion 751 slides along timing bar support 746. Horizontal portion 751 has slot 759 as shown in FIG. *8a*. Slot 759 receives a positioning screw that secures timing bar 750 with respect to timing bar support 746. Timing bar 750 includes a radial measuring element 748 attached to horizontal portion 751. Element 748 extends over portion 749 and slides along ruler 744. Element 748 is preferably secured to portion 751 by two securing elements.

As shown in FIGS. *9a* and *9b*, hub 760 has reduced diameter portion 766. Reduced diameter portion 766 is received within gripper table shaft receiving aperture 732 of base 700. Inner diameter portion 762 of hub 760 receives the gripper table shaft.

Figure 10A:
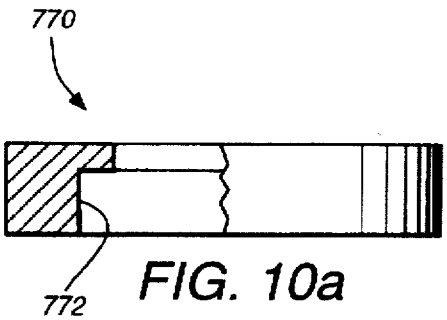
FIG. 10*a* is a side view of a cover for the gripper timing protractor of FIG. 12.
Figure 10B:
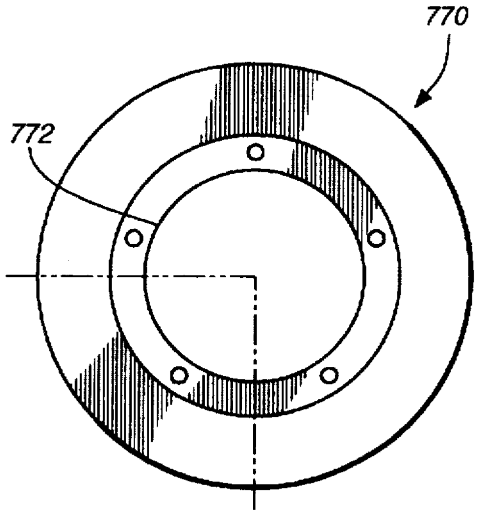
FIG. 10*b* is a top view thereof.

As shown in FIGS. 10*a* and 10*b*, cover 770 has an inner diameter 772 that receives reduced diameter portion 766 of hub 760. Cover 770 has a reduced diameter portion 774 that receives the gripper table shaft.

Figure 11A:
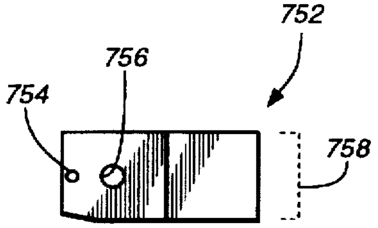
FIG. 11*a* is a top view of a hold-down for the gripper timing protractor of FIG. 12.
Figure 11B:
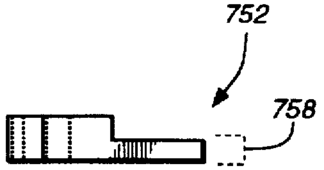
FIG. 11*b* is a side view thereof.

As shown in FIGS. 11*a* and 11*b*, hold down 752 has reduced portion 758. Hold down 752 has a roll pin receiving aperture 754 and a positioning screw receiving aperture 756. Aperture 754 receives a 3/32 inch roll pin that is also received in aperture 755. Thus, hold down 752 is connected to protractor 740 by the roll pin. A 1/4 inch tap extends through aperture 757 and into aperture 756 so as to allow hold down 752 to secure protractor 740 to base 700 by means of a positioning screw so as to prevent relative movement between protractor 740 and base 700.

Two separate gripper timing protractors may be used according to the present invention: one including a radial positioning means and another including a protractor means. The protractor means includes an angular positioning means and preferably includes an angular measuring means, such as a protractor. The radial positioning means preferably includes a radial measuring means such as a ruler. The protractor means allows the operator to determine the proper positioning of a gripper cylinder positioned on the gripper table in degrees. The arcuate or circular shape of the outer edge of the horizontal base assists the operator in making this determination.

The position measure in degrees is determined by selecting a fixed point that can be determined each time the gripper timing protractor is used. This fixed point is the point at which the horizontal base is secured using a horizontal base securing means. This securing means may be connected to or a part of the outer edge of the base and abut or connect to another stationary object or may be positioned in any other location so as to provide a stationary base. The stationary base allows the protractor to move relative to the base so as to calculate the proper timing. The preferred securing means is a block included in the horizontal base that is insertable into a fixed beam adjacent the gripper table.

Once the fixed point is selected, the protractor means may be used to determine the angular distance in degrees between that point and the point at which the gripper table receives the label from the pallet table. Since each element of the gripper table is fixed relative to each other element of the gripper table and since each element of the pallet table is fixed relative to each other element of the pallet table, the operator need only select one element from each table to align each time. The operator may then determine the proper positioning of these two selected elements by measuring the degrees between the selected fixed point and the point at which the two selected elements are aligned. The point at which the operator has determined that the selected elements are properly aligned or "timed" is referred to as the selected timing point. The preferred way to perform this measurement may be done by reading degrees marked out on the horizontal base itself. However, this measurement may be effected by use of a hand held protractor or any other means sufficient to determine the degrees or proper position between the fixed point and the selected timing point.

The preferred elements selected to align the gripper table to the pallet table are the position of gripper fingers 340 and pallet edge 240. This point is selected because it is the point at which the label is transferred from pallet 230 to gripper table 300. This occurs when gripper fingers 340 close onto anvil 350 as a result of the closing cam. The point at which the gripper fingers close on the anvil is called the closing point. Once the closing point occurs, the edge of the label is positioned between gripper fingers 340 and anvil 350. The remainder of the label is disposed over a gripper sponge 330. Thus, the closing point should occur at the right time to allow gripper fingers 340 to close onto anvil 350 close enough to pallet edge 240 to close onto the label.

The point at which gripper fingers 340 and pallet edge 240 are aligned may be easily determined by an additional vertical bar preferably attached to a pivotally coupled protractor means. The protractor means is moved until the vertical bar abuts pallet edge 240. The proper positioning may then be determined in degrees for accuracy.

The radial positioning means may also take the form of a vertical bar. The radial positioning means serves to determine the proper anvil distance. As used herein, "anvil distance" refers to the distance between the anvil and the pallet. The anvil may be moved radially in or out to modify its alignment with the pallet edge. The proper anvil distance should allow for between about 40/1000 inch to about 60/1000 inch or approximately 1 mm distance between pallet edge 240 and anvil 350. The procedure of setting this distance is referred to as "zeroing". The radial positioning means vertical bar may be the same vertical bar used as part of the protractor means. It is preferred to have a measuring means such as a ruler fixed relative to the base so that the radial position may be noted to allow for properly setting the anvil distance in subsequent operations.

The gripper timing protractor may be used by first placing it onto the gripper table shaft. It is preferred that all but one of the pallet shafts be removed from the pallet table in order to facilitate use of the gripper timing protractor. Note that it is preferred to keep pallet table cover 270 over the pallet shaft to be sure the pallet is straight in its sleeve. It may be necessary to install spacers under the gripper timing protractor to obtain the proper height. It is preferred to use the gripper timing protractor on the body label first if the pallet shaft has more than one pallet. The protractor means may then be moved to the selected timing point and the protractor timing location recorded. If the preferred optional vertical bar is attached to the protractor means, then the vertical bar location is also recorded. Moreover, the positioning means should also be used to determine the proper anvil distance and this distance should be recorded.

Once this procedure is complete, the gripper timing protractor may be readjusted to make measurements and alignments on the side of the gripper table that releases the label onto the containers located on table 20. The same procedure as used above may be used to establish the proper opening cam timing. The point at which the label leaves the label transfer system and is placed on the container is referred to as the "application point". By moving the radial positioning means, the proper setting of the application point anvil distance and the proper sponge timing may be determined.

PALLET MEASURING TOOL

The pallet measuring tool of the present invention secures pallet shaft 220 therein so as to inspect pallet 230 for wear, concentricity, swelling, bending, and for determining matching sets. The proper functioning of each pallet 230 is essential for the proper functioning of label transfer system 10.

As can be seen in FIGS. 13–21, pallet measuring tool 500 includes horizontal base 510, vertical cradle supports 520 and 522, cradle 550, vertical indicator support 540, and vertical indicator support adjustment bar 530.

Horizontal base 510 has a rectangular shape and has a first end, a second end, a front side, and a back side. Horizontal base 510 has attached thereto vertical cradle supports 520 and 522 that allow cradle 550 to pivot about a horizontal axis. Vertical cradle support 520 is attached to the first end of base 510 and vertical cradle support 522 is attached to the second end of base 510.

Indicator support adjustment bar 530 is attached to the back side of horizontal base 510. Indicator support adjustment bar 530 secures indicator support 540 in a vertical position and allows for positioning indicator support 540 with respect to pallet 230 that is secured in cradle 550.

Figure 17:
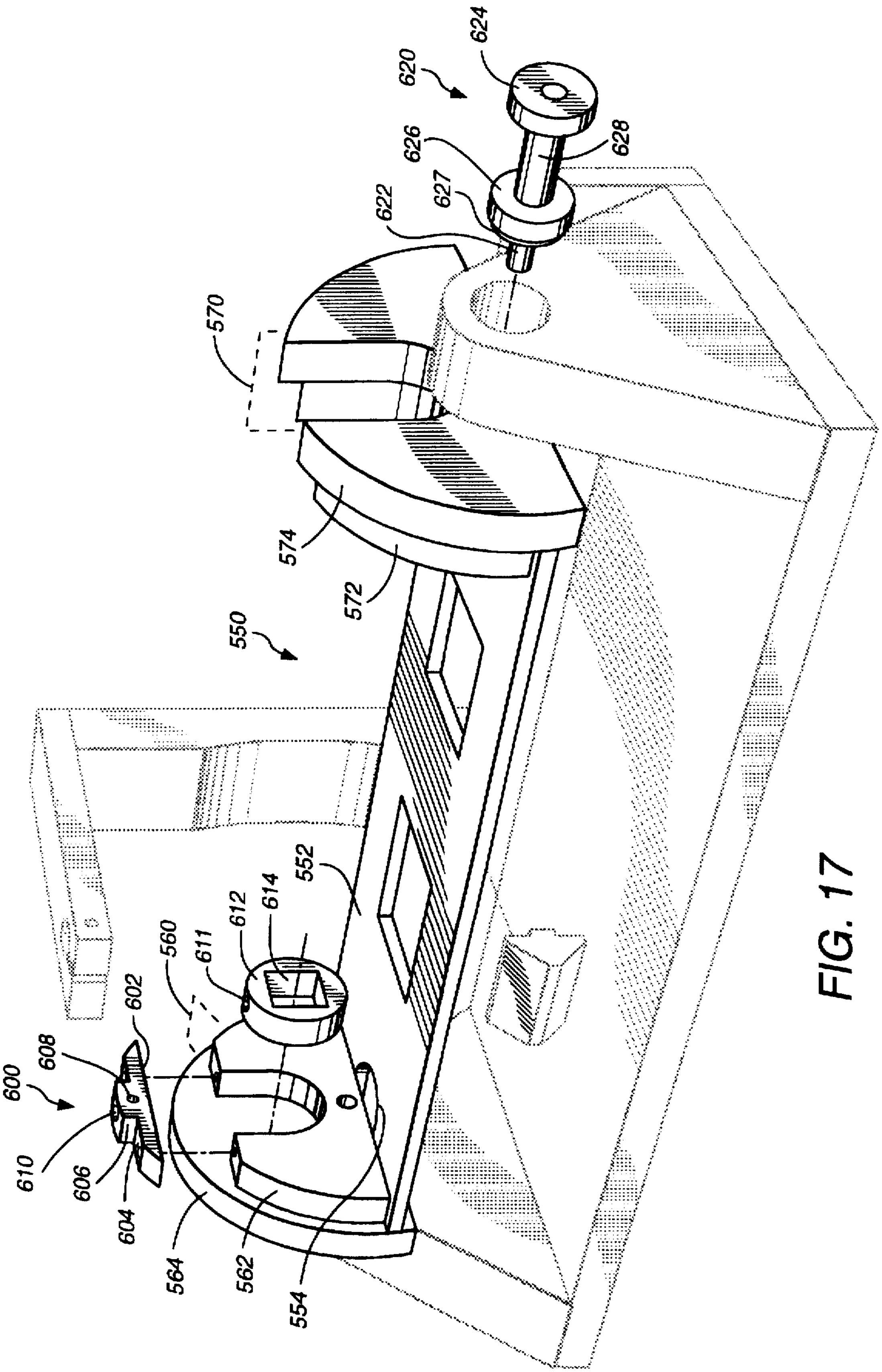
FIG. 17 is a perspective view of the pallet measuring tool showing the cradle and with the base components of FIGS. 13–16*b* shown in phantom.

Cradle 550 secures pallet shaft 220 having pallet 230 so as to allow for rotation of pallet shaft 220 with respect to base 510 but not with respect to cradle 550. As shown in FIG. 17, cradle 550 includes base 552 having a first and second end wherein pallet shaft securing means 560 is attached to the first end of cradle base 552, and pallet shaft securing means 570 is attached to the second end of cradle base 552. Pallet shaft securing means 560 is rotatably coupled to vertical cradle support 520 and pallet shaft securing means 570 is rotatably coupled to vertical cradle support 522.

As shown in FIGS. 14*a*, 14*b*, 14*c* and 15, indicator support 540 includes vertical portion 542, shown in FIG. 14*c*, and horizontal portion 544, shown in FIG. 14*a*. Horizontal portion 544 extends over cradle 550 and serves to support the indicator. The indicator is secured to horizontal portion 544 of the indicator support so as to allow inspection of the pallet attached to the pallet shaft that is secured in cradle 550. Vertical portion 542 has semicircular groove 543 disposed at about its midpoint which allows for rotation of cradle 550.

Vertical portion 542 is secured to indicator support adjustment bar 530 by a securing element 546, as shown in FIGS. 15*a* and 15*b*, that secures indicator support 540 to adjustment bar 530. Securing element 546 has portion 547 that extends outwardly from the remainder of securing element 546. The bottom portion of vertical portion 542 has portion 548 that extends outwardly from the reminder of vertical portion 542. Horizontal portion 544 also includes horizontal aperture 549 also and vertical aperture 541. Horizontal aperture 545 bisects horizontal aperture 549. Horizontal aperture 549 also connects to vertical aperture 541.

The indicator may be any device useful to determine whether pallet 230 or pallet shaft 220 is defective, such as a standard dial indicator. Potential defects in pallet 230 and pallet shaft 220 include wear, concentricity, swelling, and bending. The measuring tool is also useful for determining matching sets. A dial indicator having a concave measuring tip is preferred. The preferred indicator is a 645B5 dial indicator available from Starrett.

Figure 16A:
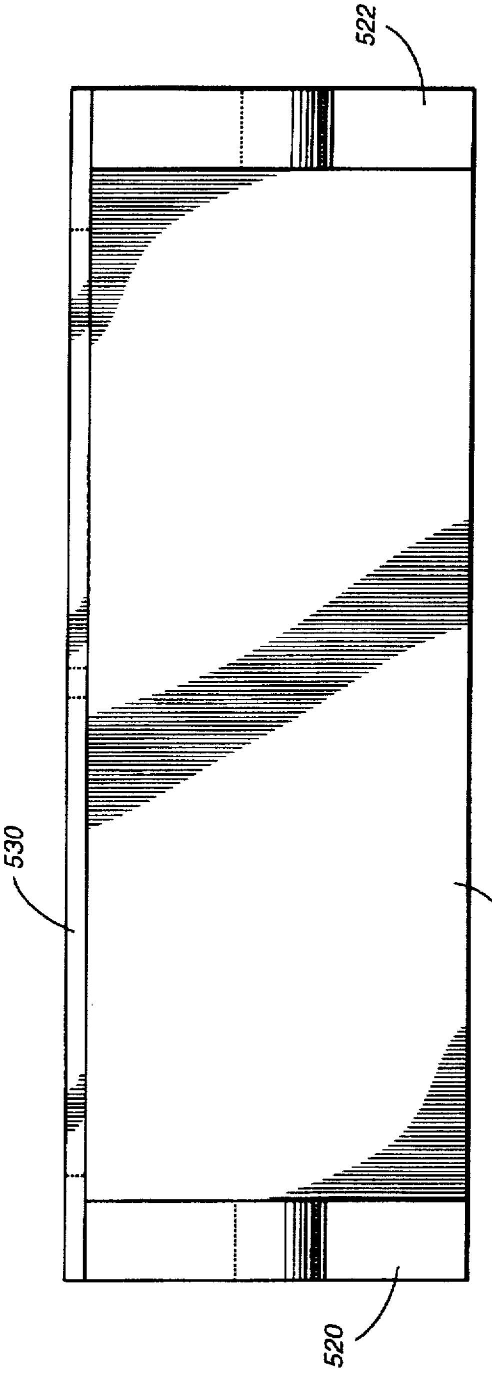
FIG. 16*a* is a top view of a vertical cradle support for the pallet measuring tool base of FIG. 13.
Figure 16C:
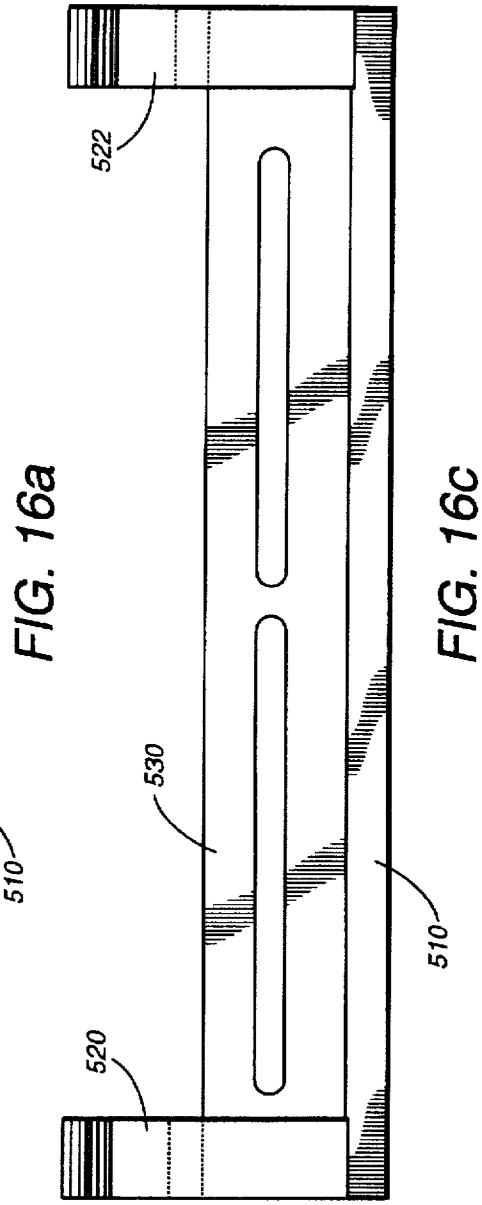
FIG. 16*c* is a side view thereof.
Figure 16B:
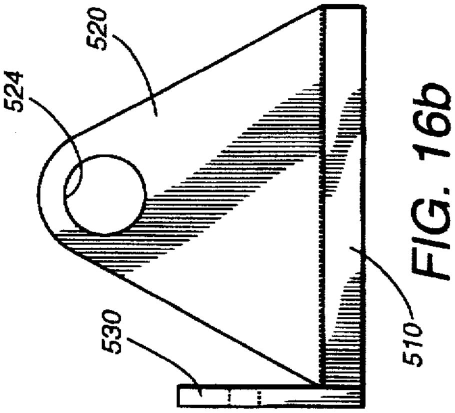
FIG. 16*b* is an end view thereof.

As shown in FIGS. 16*b* and 16*c*, vertical cradle supports 520 and 522 are placed in a respective groove in base 510 such that the cradle supports 520 and 522 are attached to base 510. Each vertical cradle support has a cradle pivot receiving channel 524 disposed in the uppermost portion of the top portion of the respective vertical cradle support.

As shown in FIG. 16*c*, indicator support adjustment bar 530 has at least one aperture having a vertical opening uniformly disposed from the top of bar 530. The preferred indicator support adjustment bar 530 includes two apertures wherein the first aperture is located near cradle support 520 and the second aperture is located near cradle support 522.

As shown in FIG. 17, cradle 550 has a cradle base 552 having a rectangular shape. Base 552 has a first end and a second end. The first end is attached to first pallet shaft securing element or means 560 and the second end of base 552 is attached to second pallet shaft securing element or means 570. Pallet shaft securing element 560 includes an inner vertical portion 562, shown in more detail in FIGS. 18*a* and 18*b*, and an outer vertical portion 564, shown in more detail in FIGS. 20*a* and 20*b*. Pallet shaft securing element 570 includes an inner vertical portion 572, shown in more detail in FIGS. 19*a* and 19*b*, and an outer vertical portion 574, shown in more detail in FIGS. 21*a* and 21*b*. The bottom portion of inner vertical portion 562 is attached to base 552. The bottom portion of inner vertical portion 572 is attached to base 552. The bottom portion of outer vertical portion 564 is attached to the bottom portion of inner portion 562. The bottom portion of outer portion 574 is attached to the bottom portion of inner portion 572.

Figures 20A, 20B:
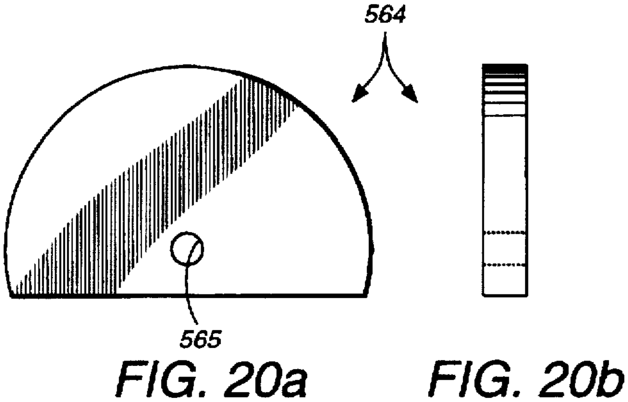
FIG. 20*a* is a side view of a first outer portion of the cradle of FIG. 17.
FIG. 20*b* is a front view thereof.

As shown in FIGS. 20*a* and 20*b*, outer portion 564 has a substantially semicircular shape having an aperture disposed at its center.

Figures 21A, 21B:
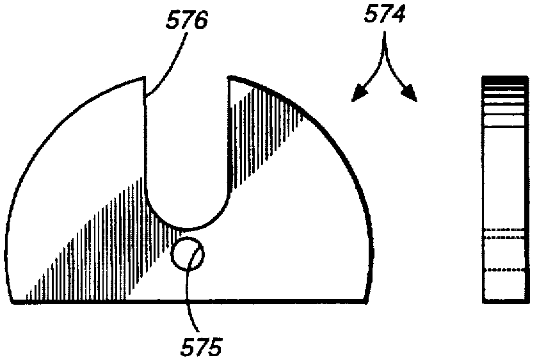
FIG. 21*a* is a side view of another outer portion of the cradle of FIG. 17.
FIG. 21*b* is a front view thereof.

As shown in FIGS. 21*a* and 21*b*, outer portion 574 has a substantially semicircular shape having aperture 575 disposed at its center. Outer portion 574 also has a pallet shaft receiving channel 576 and is disposed near the bottom portion of outer portion 574.

Figures 18A, 18B:
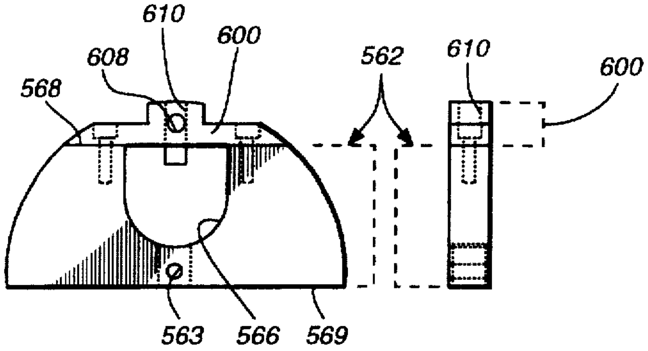
FIG. 18*a* is a side view of one inner portion of the cradle shown in FIG. 17.
FIG. 18*b* is a front view thereof.

As shown in FIGS. 18*a* and 18*b*, inner portion 562 has a semicircular shape having a top edge 568 and a bottom edge 569. Inner portion 562 also includes aperture 563 disposed at its center and pallet shaft receiving channel 566.

Figures 19A, 19B:
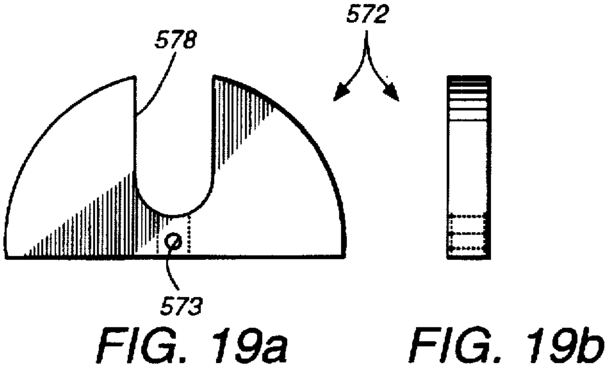
FIG. 19*a* is a side view of another inner portion of the cradle of FIG. 17.
FIG. 19*b* is a front view thereof.

As shown in FIGS. 19*a* and 19*b*, inner portion 572 has a substantially semicircular shape having aperture 573 disposed at its center. Inner portion 572 also has a pallet shaft receiving channel 578 that is disposed near the bottom portion of inner portion 572. The center of the centrally disposed aperture 573 is disposed near the bottom portion of inner portion 572.

As shown in FIGS. 17, 18*a* and 18*b*, retainer clamp 600 has bottom edge 602, top edge 604, and top portion 606, horizontal aperture 608, and vertical aperture 610. Locator aperture 610 extends vertically through retainer clamp 600. Bottom edge 602 is secured to top edge 568 of inner portion 562, as shown in FIGS. 18*a* and 18*b*.

As shown in FIG. 17, vertical cradle supports 520 and 522 have a cradle pivot 620 disposed within cradle pivot receiving channel 524. Cradle pivot 620 includes shaft 622 on which cradle 500 rotates or pivots. Cradle pivot 620 includes ball bearings 624 and 626 spaced apart by spacer 628. Washer 627 is disposed about shaft 622 and is adjacent bearing 626.

Pallet shaft receiving channel 566 further includes pallet shaft locator 612, shown in FIG. 17, having a locator pin receiving channel 611 that receives a locator pin placed through vertical aperture 610. Locator 612 has a centrally disposed rectangular shaped aperture 614.

A method for using the measuring tool involves placing a test pallet shaft in the pallet shaft holding element, orienting the indicator or other measuring element or means so as to afford analysis of the pallet, and performing and recording results of applying the indicator or other measuring element or means to the pallet.

The following examples were performed on Krones Solomatic and Topmatic rotary labeling equipment.

EXAMPLE 1

PROCEDURE FOR USING THE PALLET TIMING PLATE (SOLOMATIC AND TOPMATIC)

Purpose: To center pallets to glue roller accurately; to check for possible misalignments (such as jams).

Step 1: Remove glue roller.

Step 2: Remove pallets.

Step 3: Rotate turret and position a sleeve (beginning with # 1) in approximately centerline with the turret shaft and glue roller base.

Step 4: Insert alignment pin into sleeve (Note: key should face glue roller drive base).

Step 5: Insert timing plate onto turret shaft, alignment pin, and roller base. (Handjogging may be necessary to align turret).

Step 6: Plate should fit over all 3 locations. This would be a correctly adjusted sleeve. If sleeve does not line up, proceed to Step 7.

Step 7: In order to align sleeve, loosen 6 screws on drive sleeve. Turn alignment pin and turret until plate accepts all 3 components.

Step 8: While in position, insert Allen wrench through access hole next to the alignment pin and tighten.

Step 9: Remove plate and tighten remaining 5 screws; place plate over all three components to verify. Repeat for all remaining stations.

Note: Always turn turret in the normal sense of rotation to make adjustments.

EXAMPLE 2

PROCEDURE FOR USING PALLET CENTERLINE LOCATOR (SOLOMATIC AND TOPMATIC)

Purpose: To locate a precise centerline between the gripper shaft, turret shaft, and the pallet edge in order to obtain the correct gripper timing. This locator is also used to attain the precise timing location when using the gripper protractor.

Step 1: Remove pallets from turret.

Step 2: Remove all grippers.

Step 3: Insert any pallet into its respective sleeve. (Note: prior to using the centerline locator, ensure all pallet sleeves were checked with the pallet timing plate to insure that all sleeves are properly timed. Refer to pallet timing plate procedures).

Step 4: Place sleeved end of locator over gripper driving shaft (be sure locator blocks are in proper sense of rotation).

Step 5: Locator should be butted up against the turret shaft.

Step 6: Rotate turret so that pallet butts up against pallet locator block. Pallet is now centered.

Note: Always turn the turret in the normal sense of rotation.

EXAMPLE 3

PROCEDURE FOR USING THE GRIPPER TIMING PROTRACTOR

Purpose: The use of this device guarantees the technician will set the anvil distance, closing cam timing, gripper position, and air blast timing properly.

Notes:

A. To use this tool, proper label height and pallet height must have been determined.

B. Pallet centerline locator and pallet timing plate should have already been used to obtain/verify correct locations.

C. Once timing locations have been established (they must be established for each individual machine), the timing of the grippers for verification of overhaul purposes can be performed accurately in the shop.

D. Refer to photos for instruction clarification.

Steps:

1. Check pallet timing to ensure timing is correct for all pallets. (See pallet timing plate procedures).
2. Remove all but one pallet in order to facilitate gripper timing procedure.
3. Install timing protractor on gripper shaft—ensure that the protractor and vertical bar bolts are loose. (Be sure to install at least one and one-half inch spacer under protractor to clear turret).
4. Install a pallet into its proper sleeve and establish the pallet centerline. This is the label pickup point. (Reference pallet centerline procedure).
5. Begin with the body label (if pallet table has more than one pallet) and move timing protractor into approximate location, allowing the vertical bar to butt up lightly against the pallet. Snug down the protractor. Note: The turret cover should be placed over the pallet to be sure the pallet is straight in its sleeve.
6. Move the vertical bar so that the tip of the pallet is flush with the inner face of the bar, and snug down the hold down screw.
7. Record protractor timing location (in degrees) on the side closest to the vertical bar and then record the vertical bar location for that particular machine. (The vertical distance will have the anvil clearance deducted when recorded). Note: At this instance, the precise time that the label is "gripped" is noted. Also, the anvil distance can be determined. It is recommended that the anvil distance, gripper timing, and position be set before continuing to the next step. Hint: If the machine has been running, release location can be obtained with a fair amount of accuracy. However, if this is a newly overhauled unit or aggregate modification, it may be necessary to perform several optional steps to ensure the centerline release position.
8. Move the protractor to the bottle release side and loosen the locking screws.
9. Insert a bottle onto an adjacent centering bell and turn the carousel so that the bottle is in the centerline location with the gripper shaft and the machine center support shaft.
10. Move the aggregate so that the sponge pressure is established and verified.
11. Move the protractor so that the vertical bar edge (same as closing position) is in the release position of the anvil (the position will be in the same manner as closing).
12. Tighten the vertical bar and protractor.
13. Record the release position (in degrees). Note: The Topmatic labeler only has one vertical bar. The Solomatic has two vertical bars—left and right (A & B). Ensure that recordings are recorded as left or right. At this instance, the following have been established or determined: anvil distance, cam closing, cam opening, and air blast timing. (The air blast timing is performed in relation to the release timing).
14. If more than one label gripper table is required for the machine, i.e., body label, neck label, etc., repeat Steps 1 through 13 for each. Note: Ensure that a spacer is used to make up for gripper table that is not in place. That is, if doing the neck label, use a spacer to adjust height for body gripper since you are working up the bottle. It should also be noted that body and neck centerlines and anvil distances are the same (be sure to verify with the centerline locator). The release timing will vary to some degree, depending upon the width of the label. As in Step 7, if this is a start-up mode timing procedure, the neck release timing will have to be further checked in a "running mode" after the body and neck labels are centered in relation to each other.

EXAMPLE 4

PROCEDURE FOR USING THE PALLET MEASURING GAUGE (TOPMATIC ONLY)

Purpose: To inspect pallets for wear, concentricity, swelling, or bending; also to attain matching sets.

Step 1: Orient yourself with the gauge to determine the front, rear, left, and right. Gauge must be aligned to zero, and indicator towers should be in proper location.

Step 2: First, remove indicator towers.

Step 3: Assemble a pallet shaft with like pallets and in the same position as being tested.

Step 4: Insert pallet table by lowering round end into right side and lower until "square" end can be inserted into left side.

Step 5: Roll cradle forward (towards you) and re-mount indicator towers.

Step 6: Locate indicator tower in approximate center of pallet and tighten.

Step 7: Turn cradle to center position and install holding blocks.

Step 8: Lower indicators over tower and compress 0.010 to 0.020, and lock pinch bolt (do not over-tighten).

Step 9: "Zero" dial on indicators.

Step 10: Remove holding blocks and rotate back and forth to determine proper "zeroing" is achieved.

Step 11: Remove test pallet and insert those to be tested to determine if they are worn, out of round, or swollen.

Step 12: An account of each station should be maintained.

Step 13: The test pallet should be kept in a proper storage area so that it may be used repeatedly for "zeroing" and recording purposes.

We claim:

1. A pallet timing plate for adjusting and aligning a pallet table shaft, a pallet and a glue roller of a label transfer system of rotary labeling equipment, said pallet timing plate comprising:

a plane having a first end portion, a second end portion, and a middle portion disposed between said first end portion and said second end portion;

said first end portion having a glue roller support locator;

said second end portion having a pallet table shaft locator: and said middle portion having a pallet shaft positioner locator having a preselected angular orientation with respect to said glue roller support locator and said pallet table shaft locator wherein said pallet shaft positioner locator further comprises a keyed positioner locator formed as part of said pallet shaft positioner locator at a preselected angular location with respect to said glue roller support locator and said pallet table shaft locator.

2. The pallet timing plate of claim 1 wherein said middle portion of said plane further comprises a pallet shaft securing tool aperture.

3. The pallet timing plate of claim 1 having a pallet shaft positioner connected to said pallet timing plate at the pallet shaft positioner locator.

4. The pallet timing plate of claim 1, wherein the center of each of said glue roller support locator, said keyed positioner locator, said pallet shaft positioner locator and said pallet table shaft locator are located along a straight line with said center of the keyed positioner locator being positioned between said center of the glue roller support locator and said center of the pallet shaft positioner locator.

5. The pallet timing plate of claim 4, wherein the distance between the center of the glue roller support locator and the center of the pallet shaft positioner locator is about 3.5 inches and the distance between the center of the pallet shaft positioner locator and the center of the pallet table shaft locator is about 5.3 inches.

6. The pallet timing plate of claim 4, wherein the distance between the center of the glue roller support locator and the center of the pallet shaft positioner locator is about 3.4 inches and the distance between the center of the pallet shaft positioner locator and the center of the pallet table shaft locator is about 5.5 inches.

7. A process for adjusting and aligning a pallet table shaft, a pallet and a glue roller of a label transfer system of rotary labeling equipment wherein said label transfer system includes a glue roller support, a pallet table shaft, and a pallet table having a pallet shaft sleeve, where the process comprises the steps of:

providing a pallet timing plate having a first end portion, a second end portion, and a middle portion disposed therebetween, said first end portion including a glue roller support locator, said second end portion including a pallet table shaft locator, and said middle portion including a pallet shaft positioner locator having a keyed position locator disposed at a preselected angular orientation with respect to said glue roller support locator and said pallet table shaft locator;

placing a pallet shaft positioner in said pallet shaft sleeve; and changing the angular position of said pallet shaft sleeve until said pallet timing plate can be positioned simultaneously on said glue roller support, pallet shaft positioner and pallet table shaft such that said glue roller support locator locates said glue roller support, said pallet shaft positioner locator locates said pallet shaft positioner in a preselected angular orientation with respect to said glue roller support and said pallet table shaft, and said pallet table shaft locator locates said pallet table shaft.

8. A method for adjusting the angular position of a pallet shaft sleeve in a label transfer system of rotary labeling equipment including a pallet table shaft, a pallet shaft sleeve mounted on a pallet table and adapted for holding a pallet having a key for defining an angular orientation with respect to said sleeve, and a glue roller support, the method comprising the steps of:

a) providing a pallet timing plate having a first end portion, a second end portion, and a middle portion disposed therebetween, the first end portion including a glue roller support locator, the second end portion including a pallet table shaft locator, and the middle portion including a pallet shaft positioner locator having a keyed position locator disposed at a preselected angular orientation with respect to the glue roller support locator and the pallet table shaft locator;

b) placing a pallet shaft positioner having a key into the pallet shaft sleeve such that the key is operably engaged with the sleeve;

c) testing if the pallet timing plate can be placed simultaneously over the glue roller support, the pallet shaft positioner and the pallet table shaft such that the glue roller support locator locates the glue roller support, the pallet shaft positioner locator locates the pallet shaft positioner with the key in the keyed position locator, and the pallet table shaft locator locates the pallet table shaft; and d) if the testing in step (c) does not succeed, changing the angular position of the pallet shaft sleeve with respect to said pallet table until the pallet timing plate can be positioned simultaneously over the glue roller support, the pallet shaft positioner and the pallet table shaft such that the glue roller support locator locates the glue roller support, the pallet shaft positioner locator locates the pallet shaft positioner with the key in the keyed position locator, and the pallet table shaft locator locates the pallet table shaft, otherwise leaving the angular position of the pallet shaft sleeve with respect to the pallet table unchanged.

9. The method for adjusting the angular position of a pallet shaft sleeve as recited in claim 8, wherein the substep of changing the angular position of the pallet shaft sleeve with respect to said pallet table further comprises the steps of:

loosening the screws on the pallet shaft sleeve;

turning the pallet shaft sleeve until the testing in step (c) succeeds; and tightening at least one screw on the pallet shaft sleeve before removing the pallet timing plate.

10. The method for adjusting the angular position of a pallet shaft sleeve as recited in claim 9, wherein the substep of tightening at least one screw on the pallet shaft sleeve before removing the pallet timing plate further comprises the steps of:

inserting a pallet shaft securing tool through a pallet shaft securing tool aperture formed in said plate; and tightening one of the screws on the pallet shaft sleeve.

* * * * *